Jan. 18, 1966     K. NAGY     3,230,343
PORTABLE WELDING TIP
Filed Jan. 31, 1964
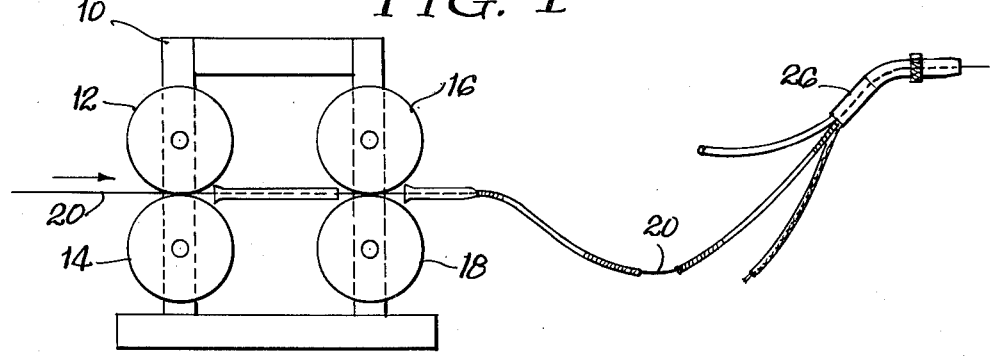
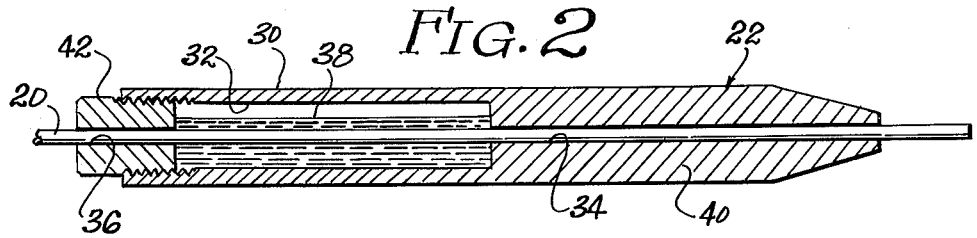
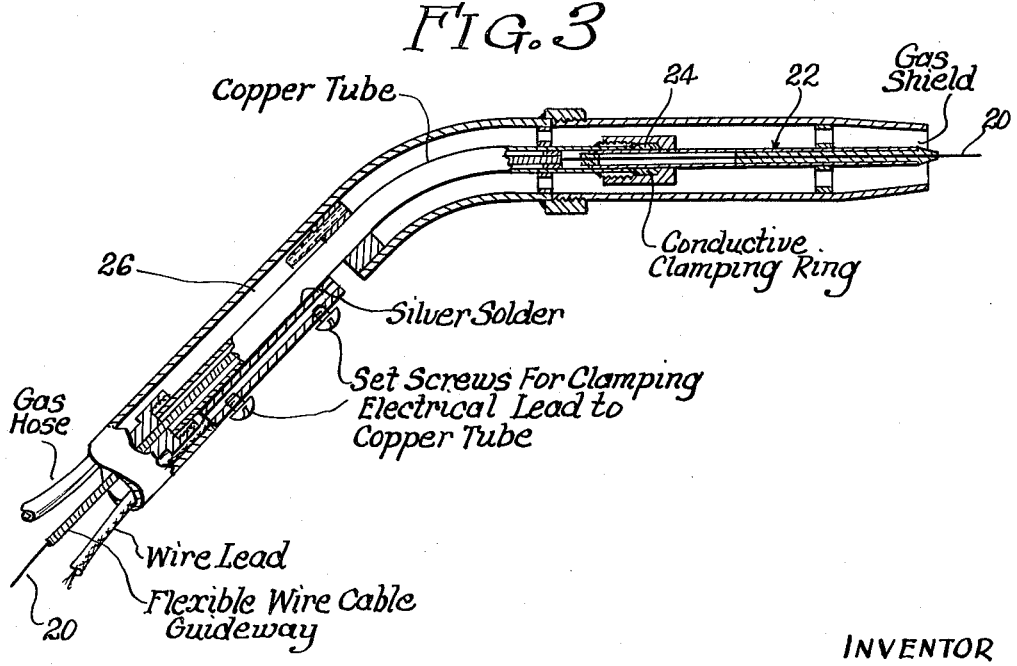
INVENTOR
Kalman Nagy
by Ooms, McDougall & Hersh
Att'ys United States Patent Office 3,230,343
Patented Jan. 18, 1966

3,230,343
PORTABLE WELDING TIP
Kalman Nagy, 3840 Roosevelt Place, Gary, Ind.
Filed Jan. 31, 1964, Ser. No. 341,507
10 Claims. (Cl. 219—130)

This invention relates to a portable arc welding device and more particularly to a new and improved tip for use with a portable arc welder through which continuous electrical contact can be maintained for striking a continuous arc while the welding wire is fed therethrough continuously at various rates.

In portable arc welding devices of the present construction, use is made of a tip in the form of an elongate cylindrical member having a bore extending continuously axially therethrough dimensioned to correspond to the cross-sectional dimension and shape of the welding wire to enable passage of the welding wire therethrough. The welding wire is advanced by feed rolls located some 12 to 18 feet from the tip in order to enable the tip assembly to be shifted through various angles and positions for displacement of the tip to the locations where the arc is to be struck. Thus the length of wire between the feed means and the welding tip is subjected to considerable turning and flexure over the length thereof.

The arc is struck from the end of the welding wire extending from the end of the tip and the electrical current necessary to maintain the arc passes from the electrical source to a contact on the peripheral surface of the tip and through the tip to the wire passing therethrough. For this purpose, it is desirable to form the tip of good electrically conductive material and to form the bore extending therethrough with minimum tolerance between the inside diameter of the bore and the outside diameter of the wire to enable the wire to be displaced lengthwise therethrough while providing for engagement between the surfaces for transmission of electrical current from the tip to the wire during passage of the wire through the tip.

As a practical matter, it has been found that after use of the tip, sometimes for as little as 5 minutes and up to a few hours, it becomes difficult to strike an arc or to maintain an arc. This is not necessarily because the tip is burned out but, instead, it appears to be more of an inability to maintain good electrical contact between the tip and the wire passing therethrough. This failure can stem from an enlargement of the bore whereby only occasional contact is made between the wire and the tip or it may result from the presence of an insulating coating formed on the surfaces of the wire or on the internal surfaces of the tip whereby transmission of the electrical current therebetween is inhibited. Whatever the reason, it become necesary often to change the tip only after a short period of use, sometimes only after 5 minutes or up to 4 hours of use, if a good welding operation is to be achieved with a portable welder. While the cost for tips becomes excessive under these conditions, the greatest objection is leveled at the amount and cost of labor required to effect the change and the inability to make use of the welding device over the relatively long period of time required to effect the changeover, often times making it necessary to carry extra devices for most efficient use of the welder's time.

Thus it is an object of this invention to provide a new and improved tip for use with portable welding devices of the type described in which the use of the welding tip is markedly increased thereby to cut down on the frequency for replacement of tips with corresponding savings in time, labor and cost, and with more efficient and effective utilization of the welding device; in which good electrical contact between the tip and the wire is maintained independent of any differences between the dimension of the wire and the bore of the tip through which the wire is advanced, or any coatings formed by corrosion, contamination or otherwise on the surfaces of the wire or tip, and in which the tip can be used without noticeable variation in performance over extended periods of use.

Antother object of this invention is to provide a new and improved welding tip for portable welding guns which is simple in construction, efficient in operation and which is capable of more effective and efficient use in the welding gun.

These and other objects and advantages of this invention will hereinafter appear and for purposes of illustration, but not of limitation, an embodiment of the invention is shown in the accompanying drawing in which—

FIG. 1 is a schematic view of the arrangement of elements suitable for use in feeding the welding wire in a portable welding gun;

FIG. 2 is a sectional elevational view of a welding tip embodying the features of this invention; and FIG. 3 is a sectional elevational view of the tip shown in FIG. 2 with the welding wire extending therethrough.

A portable arc welding device makes use of a frame 10 having longitudinally aligned pairs of driving wheels 12 and 14 and 16 and 18, mounted for rotational movement with the periphery of the wheels formed with a hemispherical groove to define a circular section between the meeting edges of a pair of wheels in which the welding wire 20 is received for lengthwise displacement by the wheels in feeding relationship to the tip 22.

The tip which is located some 12 feet from the driving means comprises a part of a movable bracket which enables the wire to be twisted and turned to bring the end of the wire extending outwardly from the end of the tip into the desired position for welding. The bracket carries the usual flexible electrical cords by which electrical current is conducted to the clamp 24 which engages the periphery of the tip 22 for the transfer of electrical current thereto. The bracket is formed with a carrying handle 26 by which the bracket and tip are easily manually manipulated.

It will be apparent that the length of the welding wire between the drive mechanism and the welding bracket must be flexible and free to bend in all directions dictated by the movement of the bracket relative to the driving mechanism during the welding operation.

In accordance with the practice of this invention, the welding tip 22 is formed of an elongate cylindrical section 30 preferably formed of an electrically conductive metal, such as copper, brass, aluminum, stainless steel, or the like, but it is not essential to form the tip of such electrically conductive metal throughout its length since reliance is not had exclusively on the metal to carry the electrical current to the welding wire 20 passing therethrough.

The cylindrical section 30, intermediate its ends, is formed with a bore 32 having a dimension considerably greater than the cross-sectional dimension of the welding wire 20 and with a portion immediately in advance of and following the hollow bore being formed with passages 34 and 36 respectively which are contiguous with the bore and dimensioned to correspond closely with the cross-sectional dimension and shape of the welding wire but sufficiently larger to enable displacement of the wire endwise therethrough while effecting a substantial sealing relationship between the wire and the tip to prevent passage of liquid housed within the bore. The bore 32 is provided with a liquid 38 which is characterized by good electrical conductivity, as represented by the preferred material, liquid mercury. The liquid conductive material 38 present within the bore 32 operates to wet out the inner surfaces of the tip and the outer surfaces of the metal welding wire during passage therethrough to effect a continuous electrical contact therebetween over a large surface area thereby to minimize hot spots and to insure good and continuous electrical transmission.

It has been found that when the bore 38 is completely filled with liquid mercury, the life of the welding tip is short by comparison with a long life of several weeks obtained when the bore is partially filled with liquid mercury to enable the free movement of the liquid mercury to wipe the respective surfaces and to displace any oxides or other corrosive insulating materials that might otherwise form. Best use is experienced when the bore is filled to about three-quarters of its volume with liquid mercury although satisfactory results can be secured when the bore is one-half to seven-eighths filled with liquid mercury.

The tip can be formed of a solid tubular metal member which is drilled only about one-half to three-fourths of the way through to form the bore 32 of large diameter, leaving the remainder 40 for drilling the bore of smaller diameter. The rear end of the bored tip can be plugged after the liquid mercury has been inserted by a plug 42 which is screwed into place to confine the liquid in the bore and which is drilled to provide the bore 36 of smaller diameter for communication with the interior of the bore 32 of large diameter. Obviously the bores in the plug 42 and in the leading end portion of the tip 40 would be blocked to prevent leakage of mercury from the preassembled tip or else liquid mercury can be poured into the tip before the plug 42 is inserted in the rear end for use.

By way of modification, the tip can be formed of a hollow tubular member with an elongate bored plug 40 pressed into the forward end and a short bored plug 42 screwed into the rearward end to from the described assembly.

A system of the type described is adapted for use with bare welding wire for arc welding. Effective use cannot be made of insulated wire or wire having a relatively rigid and brittle coating since such materials would flake or chip from the wire during flexure of the wire between the feed mechanism and the tip to introduce contaminants into the tip which might interfere with the free passage of the wire through the assembly. Such coated wire would also be faced with forces operating on the coating during pressure between the feeding rolls of the feed mechanism to cause displacement of the coating and non-uniformities in operation.

Insulation formed as a continuous protective coating on the arc welding wire would operate also to block flow of electrical current from the liquid mercury to the surface of the wire passing through the bore 32 of the tip thereby completely to negate the many advantages capable of being derived by the practice of this invention.

Attempts to bare portions of the insulated or coated wire for wetting by the mercury during passage through the bore would be undesirable in a system of the type described since such bared portions would present only limited areas for current transmission thereby excessively to concentrate current flow to limited locations with corresponding increase in current density to the point where hot spots can form to cause interferences in operation and, especially in the system described, to cause undesirable and dangerous vaporization of liquid mercury.

In the practice of this inveniton with 1/16 inch wire, the welding tip can be smoothly and efficiently operated to strike and maintain an arc with 30 to 40 volts and 125 to 160 amps. The welding tip will last for many weeks of service before requiring replacement whereas tips without mercury require change after but a few hours of service and tips completely filled with mercury often give only a few hours of continuous service.

It will be apparent from the foregoing that I have provided a new and improved welding tip assembly for use with portable arc welding devices which offers high electrical transmission for continuous and uniform use and which is capable of lasting over extended periods of continuous use without loss of arc and without requirement for replacement or repair.

It will be understood that changes may be made in the details of construction, arrangement and operation without departing from the spirit of the invention, especially as defined in the following claims.

I claim:

1. For use in a portable arc welder, a welding tip comprising an elongate member formed of a highly conductive metal having a bore extending continuously centrally axially therethrough with a length of the bore intermediate the ends being formed of larger cross-sectional dimension than the remainder to provide a cavity and in which the portions of the bore extending through the ends of the elongate member are dimensioned closely to correspond to the cross-sectional dimension and shape of welding wires adapted to be displaced lengthwise therethrough to effect a sealing relationship therebetween for sealing the cavity, and a liquid electrically conductive material partially filling the cavity.

2. An arc welding tip as claimed in claim 1 in which the liquid electrically conductive material partially filling the cavity comprises liquid mercury.

3. An arc welding tip as claimed in claim 1 in which the liquid electrically conductive material fills one-half to seven-eighths of the cavity.

4. An arc welding tip as claimed in claim 2 in which the liquid mercury fills about three-fourths of the cavity.

5. For use in a portable arc welder, a welding tip comprising an elongate tubular member at least a portion of which is formed of a highly conductive metal and which has a bore extending continuously axially therethrough with a substantial portion of the bore intermediate the ends being formed of a larger cross-sectional dimension than the remainder to provide a cavity and in which the portions of the bore extending through the ends of the tubular member are dimensioned closely to correspond to the cross-sectional dimension and shape of welding wires adapted to be displaced lengthwise therethrough to effect a sealing relationship therebetween for sealing the cavity, a liquid electrically conductive material partially filling the cavity, and an electrical contact on the outer periphery of the tubular member for passage of electrical current from the contact through the walls of the tubular member to the liquid and through the liquid to the welding wire passing therethrough.

6. An arc welding tip as claimed in claim 5 in which the liquid electrically conductive material is liquid mercury and wherein the liquid mercury fills one-half to seven-eighths of the cavity.

7. In a portable arc welder which makes use of a bare welding wire comprising, a tip in the form of an elongate member of highly conductive material having a bore extending continuously centrally therethrough with a length of the bore intermediate the ends formed of larger cross-sectional dimension that the remainder to provide a cavity and in which the portions of the bores extending through the ends of the tubular member are dimensioned to correspond to the cross-sectional dimension and shape of the welding wire to effect a sealing relationship therebetween for sealing the cavity, a liquid electrically conductive material partially filling the cavity to establish electrical communication between the elongate member and the bare welding wire extending therethrough, and means for advancing the bare welding wire through the tip during a welding operation.

8. A portable arc welder as claimed in claim 7 in which the liquid electrically conductive material partially filling the cavity comprises liquid mercury.

9. A portable arc welder as claimed in claim 7 in which the liquid electrically conductive material fills one-half to seven-eighths of the cavity.

10. An arc welding tip as claimed in claim 7 in which the elongate member comprises a tubular member and in which the tubular member is provided with a contact for communication with a source of electrical energy.

References Cited by the Examiner

UNITED STATES PATENTS 2,019,971 11/1935 Hopkins _____ 314—129
3,077,032 10/1961 Whiteman _____ 219—130

RICHARD M. WOOD, *Primary Examiner.*